United States Patent
Rossi et al.

(10) Patent No.: US 7,253,140 B2
(45) Date of Patent: Aug. 7, 2007

(54) REMOVABLE MARKING SYSTEM

(75) Inventors: Frank S. Rossi, Trumansburg, NY (US); Eva Gussack, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 397 days.

(21) Appl. No.: 10/676,487

(22) Filed: Oct. 1, 2003

(65) Prior Publication Data

US 2004/0127376 A1 Jul. 1, 2004

Related U.S. Application Data

(63) Continuation of application No. 10/175,514, filed on Jun. 19, 2002, now Pat. No. 6,653,265.

(60) Provisional application No. 60/299,521, filed on Jun. 20, 2001.

(51) Int. Cl.
*C11D 7/22* (2006.01)

(52) U.S. Cl. .............. 510/206; 510/201; 510/202; 510/203; 106/635; 134/38; 134/40

(58) Field of Classification Search .............. None
See application file for complete search history.

(56) References Cited

U.S. PATENT DOCUMENTS

| | | | | |
|---|---|---|---|---|
| 3,947,286 A | * | 3/1976 | Myers et al. | 106/444 |
| 4,612,058 A | | 9/1986 | Geke et al. | 134/38 |
| 4,661,182 A | | 4/1987 | Lerner | 156/94 |
| 4,735,995 A | * | 4/1988 | Chettiath | 525/301.5 |
| 4,800,107 A | | 1/1989 | Wickert | 427/421 |
| 5,010,131 A | | 4/1991 | Wagner | 524/457 |
| 5,041,488 A | | 8/1991 | Meades | 524/380 |
| 5,055,513 A | | 10/1991 | Banford et al. | 524/433 |
| 5,166,255 A | * | 11/1992 | Anderson et al. | 524/441 |
| 5,188,666 A | | 2/1993 | Boccardo | 106/190 |
| 5,205,837 A | * | 4/1993 | Andrean et al. | 8/405 |
| 5,453,459 A | | 9/1995 | Roberts | 524/123 |
| 6,077,898 A | | 6/2000 | Flores | 524/425 |
| 6,096,294 A | * | 8/2000 | Hansenne et al. | 424/59 |
| 6,147,041 A | | 11/2000 | Takahashi et al. | 510/174 |
| 6,242,531 B1 | * | 6/2001 | Craun et al. | 524/833 |
| 6,250,317 B1 | | 6/2001 | Nakayama | 134/38 |
| 6,653,265 B2 | * | 11/2003 | Rossi et al. | 510/206 |

* cited by examiner

*Primary Examiner*—Gregory Webb
(74) *Attorney, Agent, or Firm*—Schwegman, Lundberg, Woessner & Kluth, P.A.

(57) ABSTRACT

The present invention provides a removable marking system that includes a removable paint formulation and an aqueous removal formulation, and a method of using this removable marking system.

26 Claims, No Drawings

REMOVABLE MARKING SYSTEM

RELATED APPLICATION INFORMATION

This application is a continuation of U.S. patent application Ser. No. 10/175,514 filed Jun. 19, 2002, now U.S. Pat. No. 6,653,265, which claims the benefit of priority under 35 U.S.C. 119(e) to U.S. Provisional Patent Application Ser. No. 60/299,521, filed Jun. 20, 2001, the entirety of which is incorporated herein by reference.

BACKGROUND OF THE INVENTION

Interest in sports is increasing globally. The continued globalization of sports is enhanced through the mass media and the increased coverage of events. Moreover, participation in sports at all youth and adult recreational levels is burgeoning. Subsequently, increased access is driving demand and as a result, a favorable economic environment has been created that has trickled into the allied supportive industries, such as sports turf management.

Sports turf management involves the establishment and maintenance of athletic fields for the purpose of providing aesthetically pleasing, wear resistant, and safe surfaces for competition. Estimates from surveys indicate that the maintenance of sports turf is a burgeoning industry and is continuing to grow with the interest in a variety of sports and the development of new sports facilities. However, there is continued pressure to maintain superior aesthetic quality under intense use regimes of multiple sports clubs, for the purposes of promoting a high quality television and video product, and maintaining safety at the recreational levels.

Multi-use facilities that host a variety of sporting events must continually confront the problem of residual marking paint used to determine boundaries. Present systems and compositions for removal of paint from turf often are ineffective and hence do not thoroughly remove the previously applied paint. The painting and marking compositions and the compositions for their removal may significantly distort the visual appearance of the turf, discolor the turf, or damage the turf in other ways, or cause the affected areas of turf to be killed. This is of particular concern to sports clubs and associations that share facilities with other sports clubs for logistical and economic reasons. When sporting events are televised, residual marking paint from other sporting events detracts from the quality of the product. In addition, all levels of sports (from town and scholastic to collegiate and professional) are faced with sharing facilities that require a variety of marking patterns.

There are many other situations where a plant or surface needs to be temporarily marked or painted, and then the marking substance or paint later removed without harming the plant or surface. Examples include the surveying industry, such as for road construction or the marking of underground cable, gas, or electrical lines. Other examples include decorative uses, such as Christmas trees or other holiday decorations.

Therefore, there is a need for a non-phytotoxic system of marking and removing plant and other surfaces.

SUMMARY OF THE INVENTION

The present invention provides a removable marking system. The system comprises a removable paint formulation comprising zinc oxide, water and an adjuvant, and an aqueous removal formulation having a pH of about 4 to 8, comprising an acid and a buffering agent.

The present invention further provides method of using the system described above by applying the paint formulation and removal formulation to a plant or non-living surface.

DETAILED DESCRIPTION OF THE INVENTION

The invention is described with reference to various specific embodiments and techniques, however, it should be understood that these specific embodiments and techniques are non-limiting, and that many variations and modifications may be made while remaining within the scope of the invention.

In general, paint compositions used in many industries, including the turf and surveying industries, function by depositing a layer of pigment onto a substrate such as turf or other plants, the ground, rocks, buildings, or other structures. The pigment is typically suspended or solubilized within a carrier fluid that volatilizes or dries after the paint composition is applied, leaving behind a hardened pigment film. Thus, the key performance characteristic of both organic solvent-based and water-based paints is to deposit a permanent film for decoration and/or demarcation. Further, current paints that are designed for application onto plants, such as marking paint for grass on ball fields, contain organic solvents that remove the natural waxy layer on the surface of the grass so that the paint permanently adheres to the plant. Thus, it is not possible to remove these paints from the surface of the blades of grass without harming the grass.

By contrast, the paint formulation of the present invention is non-phytotoxic. In other words, the paint can be applied to the surfaced of a targeted plant and not harm or kill the plant. The paint formulations do not contain organic solvents, as these could potentially harm a target plant.

Further, a key performance characteristic of the paint of the present invention is to deposit a temporary film that easily may be removed without harming or discoloring the surface to which it had been applied. Thus, the aqueous paints of the invention can be used, for example, to mark turf on athletic fields. They may be used by surveyors and landscapers for ground marking, utility line identification or as road markers. Paints of the invention are also very useful for marking tanks and lumber for identification purposes. The paint of the present invention is preferred over presently available formulations in that if it were accidentally sprayed onto surrounding plants, it would not harm the plants, and could be readily removed from the plants without harming the plants.

The system of the present invention also provides a removal formulation that is non-phytotoxic and does not contain organic solvents. When the removal formulation is applied to the paint formulation of the present invention that has been applied to a living or non-living surface, the acid in the removal formulation combines with the zinc oxide to produce harmless zinc acetate. The paint formulations and removal formulations will be described in detail below, as well as a description of the method of using the paint and removal formulation.

I. Paint Formulations

The paint formulations of the present invention are water-based and contain zinc oxide. Zinc oxide is useful because it is relatively inexpensive and is commercially available from several suppliers (e.g., Aldrich Chemical Company, Milwaukee, Wis., U.S.A. and the Sigma Chemical Company, St. Louis, Mo., USA). Zinc oxide is also useful because it is white, the preferred color for most athletic fields. Also, colored pigments can be easily added to the paint formulation if other colors are desired. Colored pigments useful in the formulations of the invention are readily available from commercial suppliers. The zinc oxide of the present invention is present in the paint formulation at a concentration in the range of about 10% to 30%. In particular, the concentration of the zinc oxide is about 20%.

A propellant can be combined with aqueous paint suspensions of the invention to provide an aqueous aerosol paint. Suitable propellants do not react with any of the other components of the paint and do not adversely affect the film-forming properties of the paint when sprayed onto a substrate surface. For example, the propellant can be condensed air, or $CO_2$. The paints of the invention may be formed by adding an amount of aqueous paint suspensions into an aerosol can or tube, crimping a valve onto the shoulder of the can or tube, drawing a vacuum on the sealed and filled can or tube, and then charging the filled can or tube through the valve stem with an appropriate amount of propellant.

An adjuvant, also called a surfactant in the industry, is added to the paint formulation and/or removal formulation. Such adjuvants assist in allowing the paint or removal formulation to be evenly spread onto the target surface and to prevent it from beading up on the target surface. The adjuvant also assists in having the paint remain adhered to the target surface, such as grass, even if it comes into contact with another surface, such as the feet of a soccer player. The adjuvant also assists in having the paint in being "rainfast," i.e., the paint remains on the target surface through a rain or irrigation event. The adjuvant used in the present invention includes spray adjuvants. In particular, the adjuvant is a non-ionic spreader/sticker. Examples of adjuvants useful in the present invention include COHERE® brand adjuvant, TACTIC® brand adjuvant, LASTICK® brand adjuvant and TRANSFIX® brand adjuvant. COHERE® brand adjuvant is commercially available from Helena Chemical Company, Memphis, Tenn., USA; TACTIC® brand adjuvant is available adjuvant from Loveland Industries, CO, USA; LASTICK® brand adjuvant is available adjuvant from Helena; and TRANSFIX® brand adjuvant is available adjuvant from Cenex, Minn., USA. In a preferred embodiment, COHERE® brand adjuvant is selected.

Thus, the removable paint formulation of the present invention is an aqueous paint that contains zinc oxide, an adjuvant, and optionally colored pigments and/or a propellant. It should be noted that the paint formulation of the present invention can adhere to the outer natural surface of a plant, such as the natural waxy substance on the surface of a blade of grass. It does not require the removal of this waxy substance in order to sufficiently adhere like other field paints that use organic solvents to permanently adhere the paint to the plant surface.

II. Removal Formulations

The removal formulations of the present invention are aqueous formulations with a pH of about 4 to 8 containing an acid and a buffering agent. The formulations may optionally contain a propellant. Like the paint formulation of the present invention, the removal formulation of the present invention is non-phytotoxic.

Acids useful in the present invention are weak acids. The preferred acid is acetic acid (e.g., Aldrich Chemical Company, Milwaukee, Wis., U.S.A. and the Sigma Chemical Company, St. Louis, Mo., USA). The acid in the removal formulation is present in a concentration range of about 3.5% to 6%. Preferably, the acid is present at a concentration of about 4.5%.

The pH of the removal formulation is important so that it does not harm the target plant. The range of the removal formulation should be about 4 to 8, even about 4.5 to 7.5. The preferred pH is about 6 to 6.5.

The buffering agent in the removal formulation can be a weak base. Preferably, the buffering agent is $NH_4OH$. The buffering agent in the removal formulation is present in a concentration range of about 1.5% to 3%. Preferably, the buffering agent is present at a concentration of about 1.875%.

The removal formulation does not contain organic solvents, as these could harm a target plant.

III. Method of Use/Administration of Removable Marking System

The method of the present invention involves the application of a paint formulation of the present invention onto a plant or non-living surface, followed by the application of a removal formulation of the present invention. The removal formulation may be followed with a water drench. For example a wash step may be applied within about five minutes of the application of the removal formulation.

The paint and removal formulations may be administered repeatedly to the same target, such as a ball field. The paint and removal formulations will not harm a living surface, such as turf grass, even with repeated administrations.

When used herein, the term "administer" includes, but is not limited to, the direct application of a paint formulation to a plant or non-living surface via spray, dusting, or direct application by hand. For purposes of this invention, the paint and/or removal formulations can be applied singly or repeatedly. The formulations can be applied as a liquid, as a crude mixture, or as an agronomic formation. Agronomic formulations include, for example, solutions, liquid suspensions, emulsions, wettable powders, dusts, emulsifiable concentrates, aerosols, and granular formulations. In general, the paint formulations are present in a dispersed or readily dispersible form. Dispersibility promotes thorough and uniform coverage of, or contact with, any plant or turf, or any target plot of soil. In some situations a wetting or dispersing agent, or other active ingredients may be added. The paint and/or removal formulations can be applied to the target surface through available turf marking paint equipment, or other commercially available applicators.

It will be understood, of course, that a choice of concentration of paint formulation depends upon the method of application as well as the type of formulation and the degree of decoration or demarcation desired.

The following examples are intended to illustrate but not limit the invention.

EXAMPLES

Example 1

Greenhouse Study

A study was conducted to determine the optimal composition for the turf paint. For this study, the paint compositions contained Zinc Oxide (Fisher Chemicals, USA), water (pH 6.5-7.5) and a surfactant to reduce surface tension so paint will adhere to leaf blade. The paint compositions were devised to approximate the consistency of water soluble non-removable paints currently available on the market (i.e., a 1:2 ratio of paint to water). Treatments were limited to 2 different concentrations of zinc oxide+water and +/−one of 4 adjuvants:

| Paint | | | |
|---|---|---|---|
| Paint | Concentration | ZnO | H2O |
| Paint 1 | 20% ZnO | 80 gm ZnO | 400 ml $H_2O$ |
| Paint 2 | 25% ZnO | 100 gm ZnO | 400 ml $H_2O$ |

| Surfactant | | | | |
|---|---|---|---|---|
| Surfactant | Manufacturer | Rate | Amt. $L^{-1}$ | Comments |
| COHERE ™ | Helena Chemicals | 1.2* and 2 pt/100 gal | 1.5 and 2.5 ml | Best Cover |
| LASTICK ™ | Helena Chemicals | 12 oz and 16 oz/A | 0.9 ml and 1.25 ml | Beaded |
| TACTIC ™ | Loveland Industries | 16 oz/100 gal | 1.25 ml | Acceptable |
| Bond | Loveland Industries | 2 pt/100 gal | 2.5 ml | Beaded |

*Not labeled at this rate

| Treatments | | |
|---|---|---|
| Treatment | ZnO | Surfactant |
| Treatment 1 | 20% | − |
| Treatment 2 | 20% | + |
| Treatment 3 | 25% | − |
| Treatment 4 | 25% | + |

For greenhouse studies (Cornell University, Ithaca, N.Y.) water was added to ZnO in 2-liter plastic bottles sealed and agitated for 5 minutes at room temperature. In treatments that contain adjuvants the surfactants were added during agitation. The suspension was filtered using a common household mesh paint filter. Treatments were applied to 1×1 inch flats of TIFWAY™ 419 Bermuda grass maintained at 0.5 to 0.75 inch and irrigated every other day. Method of application was a $CO_2$ backpack sprayer (60 and 75 psi) using a 4001 TEEJET™ nozzle to create the sports line. Flats were rated daily for quality and persistence following rain/irrigation/mowing events. Initial field studies (Lockhart Stadium, Ft. Lauderdale, Fla.) followed the same protocol with treatments applied to a dormant Bermuda grass overseeded with perennial ryegrass Results showed that the 1:5 ZnO suspension with the 1.2 pt/100 gallon COHERE™ surfactant delivered at 75 psi consistently provided a high quality, persistent white line on both the Bermuda and rye-grasses.

| Removal Formulation | | |
|---|---|---|
| Treatment | Formulation | pH |
| Treatment 1 | 4.5% acetic acid | 2.5 |
| Treatment 2 | 1.875% $NH_4OH$ | 12 |
| Treatment 3 | Trt. 1 followed by trt. 2 | 2.5 followed by 12 |
| Treatment 4 | 4.5% acetic acid and 1.875% $NH_4OH$ | 6.5 |

In greenhouse studies (Cornell University, Ithaca, N.Y.) removal formulations were mixed in 2 L plastic bottles and sprayed on existing paint lines (20% ZnO+1.2 pt rate of COHER™) at 75 psi with an 8015F TEEJE™ nozzle. All treatments were followed with a water wash (room temperature, pH 6.5 to 7.5). Paint was removed from 1×1 inch flats of Bermuda grass after 2 hours, 12 hrs, 24 hrs, 48 hrs and 72 hrs. Trials were repeated from November 1999 to April 2000. All treatments removed the ZnO paint. Turf treatments 1, 2 and 3 displayed damage ranging from mild browning-out to necrosis (within 24 hrs) most probably due to pH extremes. Treatment 4 was titrated to pH 6 to 6.5 (500 ml 4.5% acetic acid+1200 ml 1.875% $NH_4OH$) and applied to turf with no resulting turf damage. Preliminary field tests (Lockhart Stadium, Ft Lauderdale, Fla.) followed same protocol using perennial ryegrass and removed the paint without damage to the turf. In secondary field trials 5 gal containers of 20% ZnO paint+1.2 pt rate COHER™ was applied using a commercial parking lot line paint machine with 2000 psi. Paint went on smoothly and whitened up as it dried (20 min). Removal formulation (Treatment 4) applied at this pressure vaporized before reacting with ZnO and a faint line remained. For high quality, consistent removal, a lower psi for the ammonium acetate formulation is recommended.

The inventors found that Bermuda grass could tolerate at least 7 consecutive applications without unacceptable turf injury.

Example 2

Field Studies

An experiment was performed at the Cornell Turfgrass Research facility beginning late October 1999 on KBG, perennial ryegrass and fine fescue field using formulations that were expected to dissolve. A 5% acetic acid solution was applied with a $CO_2$ backpack sprayer calibrated to deliver 80 gallons per acre at 55 psi through 8012E flat fan nozzles and followed within five minutes with a water drench. The paint was removed with some injury noted at low temperatures.

The formula for the process is: $ZnO+2HC_2H_3O_2$ yields $Zn(C_2H_3O_2)+H_2O$. Essentially the chemical reaction converts the white ZnO to the colorless zinc acetate. This reaction involves the use of acetic acid with pH of 2.0 that has a high potential to cause injury. Although the process was successful with only mild injury, problems could result from using highly acidic materials on turfgrass.

As a result of these concerns, the use of ammonium hydroxide (pH 11.0) to buffer the acetic acid pH was studied. In this system, acetic acid was applied to the painted grass, followed by an application of a 2.5% solution of ammonium hydroxide. After the treatment with ammonium hydroxide, the grass was washed with water.

The formula for this second dissolving process is: $ZnO+2HC_2H_3O_2$ yields $Zn(C_2H_3O_2)+H_2O$ then $Zn(C_2H_3O_2)+2$ ($NH_3$)+$H_2O$+$CO_2$ yields 2 ($CH_3COONH_4$)+$ZnCO_3$. Again, once the zinc acetate is formed, to manage the low pH, the ammonium hydroxide is applied and yields ammonium acetate and zinc carbonate, both colorless compounds.

Additional preliminary field tests were conducted at Lockhart Stadium, Ft Lauderdale, Fla. in March 2000. The same protocol was followed as the greenhouse work discussed in Example 1 above using perennial ryegrass and removed the paint without damage to the turf.

Secondary field trials were also conducted at Lockhart Stadium, Ft Lauderdale, Fla. in May 2000. In these trials, 5 gal containers of 20% ZnO paint+surfactant was applied using a commercial parking lot line paint machine with 50 psi. Paint went on smoothly and whitened up as it dried (20 min). Removal solution (Treatment 4) applied at this pressure vaporized before reacting with ZnO and a faint line remained. For high quality, consistent removal a lower psi or larger nozzle droplet size for the ammonium hydroxide acetic acid solution is recommended.

All publications, patents and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

We claim:

1. A removable paint formulation comprising zinc oxide, water and an adjuvant;
   wherein the adjuvant comprises synthetic latex surfactants and organosilicone surfactants;
   wherein the removable paint formulation is non-phytotoxic and the paint can be removed without harming or discoloring the surface to which it was applied.

2. The paint of claim 1, wherein the adjuvant is a spray adjuvant.

3. The paint of claim 1, wherein the adjuvant is a non-ionic spreader/sticker.

4. A removable paint formulation comprising zinc oxide, water and an adjuvant the adjuvant comprising alkanolamine surfactants, alkylaryl polyethanol sulfates, and 1,2-propanediol; wherein the adjuvant is a non-ionic spreader/sticker.

5. The paint of claim 1, wherein the zinc oxide is present in a range of 10% to 30%.

6. The paint of claim 1, wherein the zinc oxide is present at a concentration of about 20%.

7. The paint of claim 1, further comprising a colored pigment.

8. The paint of claim 1, further comprising a propellant.

9. The paint of claim 8, wherein the propellant is condensed air or $CO_2$.

10. The paint of claim 8, wherein the propellant does not adversely react with the film-forming properties of the paint when sprayed onto a surface.

11. The paint of claim 1, wherein the paint lacks an organic solvent.

12. The paint of claim 1, wherein the paint is rainfast.

13. The paint of claim 1, wherein the paint can be deposited temporarily on a plant or non-living surface.

14. A paint formulation, comprising zinc oxide, water, and an adjuvant, wherein the paint is rainfast and wherein the paint can be removed without harming or discoloring the surface to which it was applied and wherein the adjuvant comprises di-1-p-menthene.

15. The paint of claim 4, wherein the adjuvant is a spray adjuvant.

16. The paint of claim 4, wherein the adjuvant is a non-ionic spreader/sticker.

17. The paint of claim 4, wherein the zinc oxide is present in a range of 10% to 30%.

18. The paint of claim 4, wherein the zinc oxide is present at a concentration of about 20%.

19. The paint of claim 4, further comprising a colored pigment.

20. The paint of claim 4, further comprising a propellant.

21. The paint of claim 20, wherein the propellant is condensed air or $CO_2$.

22. The paint of claim 20, wherein the propellant does not adversely react with the film-forming properties of the paint when sprayed onto a surface.

23. The paint of claim 4, wherein the paint lacks an organic solvent.

24. The paint of claim 4, wherein the paint is rainfast.

25. The paint of claim 4, wherein the paint can be deposited temporarily on a plant or non-living surface.

26. A paint formulation, comprising zinc oxide, water, and an adjuvant, wherein the paint is rainfast and wherein the paint can be removed without harming or discoloring the surface to which it was applied and wherein the adjuvant comprises a polymer of α-pinene.

* * * * *